United States Patent
Floyd, III et al.

(10) Patent No.: US 10,623,195 B2
(45) Date of Patent: *Apr. 14, 2020

(54) PROTECTING A NETWORK FROM A UNICAST FLOOD

(71) Applicant: INTERNATIONAL BUSINESS MACHINES CORPORATION, Armonk, NY (US)

(72) Inventors: Robert K. Floyd, III, Clermont, FL (US); James W. Ling, McKinney, TX (US); Roger Hoffmann, Munich (DE); Catalin Dumitru Marica, Bucharest (RO)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/369,510

(22) Filed: Mar. 29, 2019

(65) Prior Publication Data

US 2019/0229940 A1    Jul. 25, 2019

Related U.S. Application Data

(63) Continuation of application No. 15/834,172, filed on Dec. 7, 2017, now Pat. No. 10,333,729.

(51) Int. Cl.
*H04L 12/18* (2006.01)
*H04L 29/12* (2006.01)
(Continued)

(52) U.S. Cl.
CPC ........ *H04L 12/1886* (2013.01); *H04L 45/021* (2013.01); *H04L 45/32* (2013.01);
(Continued)

(58) Field of Classification Search
CPC ... H04L 12/1886; H04L 45/021; H04L 45/32; H04L 45/66; H04L 45/745; H04L 61/6022; H04L 49/351
See application file for complete search history.

(56) References Cited

U.S. PATENT DOCUMENTS 8,908,564 B2   12/2014   Assarpour
9,807,020 B2   10/2017   Mekkattuparamban
(Continued)

FOREIGN PATENT DOCUMENTS

CN   103095717 B   5/2013
CN   103269299 B   8/2013

OTHER PUBLICATIONS

Syta, James M.; List of IBM Patents or Patent Applications Treated as Related; Mar. 29, 2019; 1 page.

*Primary Examiner* — Paul H Masur
(74) *Attorney, Agent, or Firm* — Schmeiser, Olsen & Watts; Michael P. O'Keefe

(57) ABSTRACT

An approach is provided for protecting a network from a unicast flood. If the destination MAC address of a frame is not included in a table of unknown MAC addresses, the MAC address is added to the table and the frame is forwarded to non-blocked spanning tree links to find the MAC address in the network. If the MAC address is included in the table, and if a timer for suppressing forwarding of frames is active, the frame is discarded, or if the timer is inactive, a counter for counting received frames is incremented and compared to a threshold value. If the counter is greater than the threshold value, the timer is activated and the frame is discarded. If the counter is not greater than the threshold value, the frame is forwarded to the non-blocked spanning tree links to find the MAC address in the network.

12 Claims, 4 Drawing Sheets

(51) Int. Cl.
*H04L 12/755* (2013.01)
*H04L 12/741* (2013.01)
*H04L 12/931* (2013.01)
*H04L 12/721* (2013.01)

(52) U.S. Cl.
CPC .......... *H04L 45/745* (2013.01); *H04L 49/351* (2013.01); *H04L 61/6022* (2013.01)

(56) References Cited

U.S. PATENT DOCUMENTS

| | | |
|---|---|---|
| 2008/0123649 A1 | 5/2008 | Wang |
| 2010/0020814 A1 | 1/2010 | Thyni |
| 2012/0063306 A1 | 3/2012 | Sultan |
| 2013/0003737 A1 | 1/2013 | Sinicrope |
| 2014/0044130 A1 | 2/2014 | Banavalikar |
| 2015/0156108 A1 | 6/2015 | Shi |
| 2015/0222448 A1 | 8/2015 | Banavalikar |
| 2016/0315851 A1 | 10/2016 | Kaliyamoorthy |

PROTECTING A NETWORK FROM A UNICAST FLOOD

CROSS REFERENCE TO RELATED APPLICATIONS

This application is a continuation application claiming priority to Ser. No. 15/834,172 filed Dec. 7, 2017, now U.S. Pat. No. 10,333,729, issued Jun. 25, 2019, the contents of which are hereby incorporated by reference.

BACKGROUND

The present invention relates to managing computer networks, and more particularly to managing unicast floods in networks.

An unknown unicast flood is created by sending Ethernet frames to a media access control (MAC) address that is unknown by a network. Since the destination MAC address is unknown, the frames are flooded out to all forwarding interfaces to all other switches, which in turn creates the same flooding of unknown unicast traffic until the source of the frames stops sending. Unknown unicast floods can starve the network of bandwidth and processing cycles.

Legitimate reasons for an unknown unicast frame to be seen include mismatched MAC aging timers between hosts and network devices where a known destination is disconnected or powered off from the network, or aged out on a switch but not aged out on a host trying to communicate.

Currently known storm control techniques limit the impact of unknown unicast floods by using a suboptimal approach of limiting a link by a percent of utilization, leading to wasted network resources and affecting legitimate traffic that is blocked when interface-wide limits are reached.

SUMMARY

In one embodiment, the present invention provides a method of protecting a network from a unicast flood. The method includes a processor in a switch of the network receiving a frame having a media access control (MAC) address that is unknown to the network. The MAC address is an address of a destination of the frame. The method further includes the processor determining whether the MAC address is included in a table of unknown MAC addresses. The method further includes if the MAC address is not included in the table, the processor adding the MAC address to the table together with a timestamp and forwarding the frame to non-blocked spanning tree links to attempt to find the MAC address in the network, or if the MAC address is included in the table, the processor determining whether a timer for suppressing forwarding of frames is active, and if the timer for suppressing forwarding of frames is active, the processor discarding the frame, or if the timer for suppressing forwarding of frames is not active, the processor incrementing a counter for counting received frames and determining whether the counter is greater than a threshold value, and if the counter is greater than the threshold value, the processor activating the timer for suppressing forwarding of frames for a period of time and discarding the frame, or if the counter is not greater than the threshold value, the processor forwarding the frame to the non-blocked spanning tree links to attempt to find the MAC address in the network.

In another embodiment, the present invention provides a computer program product for protecting a network from a unicast flood. The computer program product includes a computer readable storage medium. Computer readable program code is stored on the computer readable storage medium. The computer readable storage medium is not a transitory signal per se. The computer readable program code is executed by a hardware processor of a computing device in the network to cause the computing device to perform a method. The method includes the processor receiving a frame having a media access control (MAC) address that is unknown to the network. The MAC address is an address of a destination of the frame. The method further includes the processor determining whether the MAC address is included in a table of unknown MAC addresses. The method further includes if the MAC address is not included in the table, the processor adding the MAC address to the table together with a timestamp and forwarding the frame to non-blocked spanning tree links to attempt to find the MAC address in the network, or if the MAC address is included in the table, the processor determining whether a timer for suppressing forwarding of frames is active, and if the timer for suppressing forwarding of frames is active, the processor discarding the frame, or if the timer for suppressing forwarding of frames is not active, the processor incrementing a counter for counting received frames and determining whether the counter is greater than a threshold value, and if the counter is greater than the threshold value, the processor activating the timer for suppressing forwarding of frames for a period of time and discarding the frame, or if the counter is not greater than the threshold value, the processor forwarding the frame to the non-blocked spanning tree links to attempt to find the MAC address in the network.

In another embodiment, the present invention provides a computer system including a hardware processor; a memory coupled to the processor; and a computer readable storage device coupled to the processor. The storage device includes instructions that are executed by the processor via the memory to implement a method of protecting a network from a unicast flood. The computer system is a switch in the network. The method includes the processor receiving a frame having a media access control (MAC) address that is unknown to the network. The MAC address is an address of a destination of the frame. The method further includes the processor determining whether the MAC address is included in a table of unknown MAC addresses. The method further includes if the MAC address is not included in the table, the processor adding the MAC address to the table together with a timestamp and forwarding the frame to non-blocked spanning tree links to attempt to find the MAC address in the network, or if the MAC address is included in the table, the processor determining whether a timer for suppressing forwarding of frames is active, and if the timer for suppressing forwarding of frames is active, the processor discarding the frame, or if the timer for suppressing forwarding of frames is not active, the processor incrementing a counter for counting received frames and determining whether the counter is greater than a threshold value, and if the counter is greater than the threshold value, the processor activating the timer for suppressing forwarding of frames for a period of time and discarding the frame, or if the counter is not greater than the threshold value, the processor forwarding the frame to the non-blocked spanning tree links to attempt to find the MAC address in the network.

Embodiments of the present invention protect networks from unknown unicast floods, thereby preventing the unknown unicast flood from starving a network of bandwidth and processing cycles, while minimizing effects on legitimate network traffic and without wasting network resources. Embodiments of the present invention facilitate identifying whether a malicious host is the source of an unknown unicast flood. without wasting network resources and while minimizing effects on legitimate network traffic.

DETAILED DESCRIPTION

Overview

Embodiments of the present invention protect a network from a unicast flood by determining whether to drop or discard an unknown unicast frame within a predefined period of time. In one embodiment, each frame with a destination MAC address that is unknown to the network is added to an "unknown MAC address table." If the MAC address is discovered due to the MAC address referencing a silent host, then subsequent frames may be forwarded and not counted as future entries in the table. If the MAC address remains unlearned, subsequent frames may be counted against the table until a limit is reached and the frames are discarded. The discard and table entry purge duration is definable by an administrator to be as aggressive or as tolerant as the network and application environment warrant.

In one embodiment, the protection of a computer network from a unicast flood by discarding unknown unicast frames within a predefined period of time facilitates an identification of a malicious host that is trying to sweep the computer network for hosts or deprive the computer network of bandwidth. In one embodiment, hosts that are sending out unknown unicast frames are identified and an audit of the identified hosts determines whether any of the hosts are malicious.

System for Protecting a Network from a Unicast Flood

Figure 1:
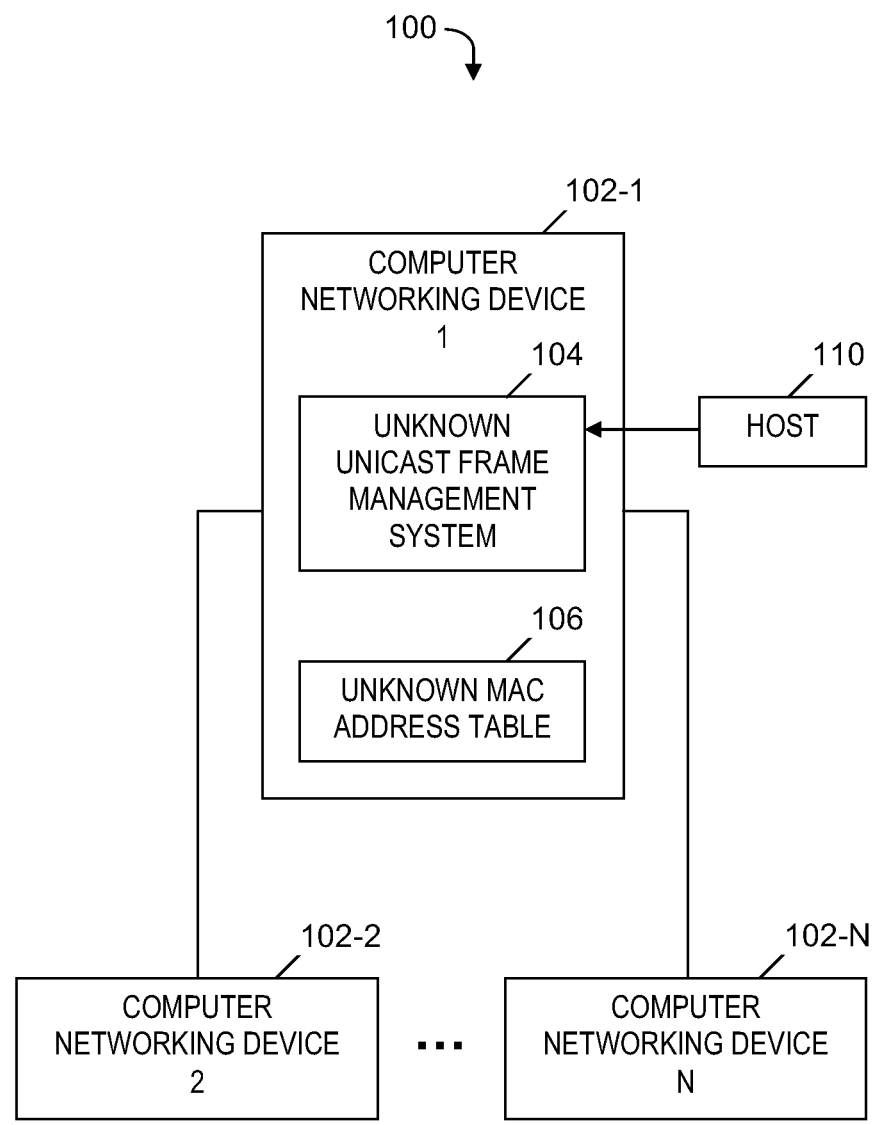
FIG. 1 is a block diagram of a system for protecting a network from a unicast flood, in accordance with embodiments of the present invention.

FIG. 1 is a block diagram of a system 100 for protecting a network from a unicast flood, in accordance with embodiments of the present invention. System 100 includes a computer networking devices 102-1, 102-2, . . . , 102-N, which are required to mediate data and required for communication and interaction between devices on a computer network, where N is an integer greater than or equal to two. In one embodiment, computer networking devices 102-1, 102-2, . . . , 102-N are network switches (hereinafter referred to simply as switches). Computer networking device 102-1 includes a software-based unknown unicast frame management system 104 and an unknown MAC address table 106. System 100 also includes a host 110 (i.e., a network host), which is a computer or other device which sends frames (i.e., digital data transmission units) to computer networking device 102-1 in a computer network (not shown). In one embodiment, the frames sent by host 110 to computer networking device 102-1 are Ethernet frames.

Unknown unicast frame management system 104 protects the computer network from a unicast flood. For each frame received at computer networking device 102-1 that has a destination MAC address that is unknown to the computer network, unknown unicast frame management system 104 adds the destination MAC address to unknown MAC address table 106 if the destination MAC address is not already in the unknown MAC address table 106. If the destination MAC address is in unknown MAC address table 106, then unknown unicast frame management system 104 increments a count of the received frames for which the frames' destination MAC addresses are in unknown MAC address table 106. In response to the count exceeding a predefined threshold, a suppression timer is activated for a predefined period of time, during which subsequent frames received by computer networking device 102-1 which have destination MAC addresses that are in unknown MAC address table 106 are discarded (i.e., subsequent communication with unknown unicasts in the computer network is dampened for the predefined of time to prevent a unicast flood).

Figure 2:
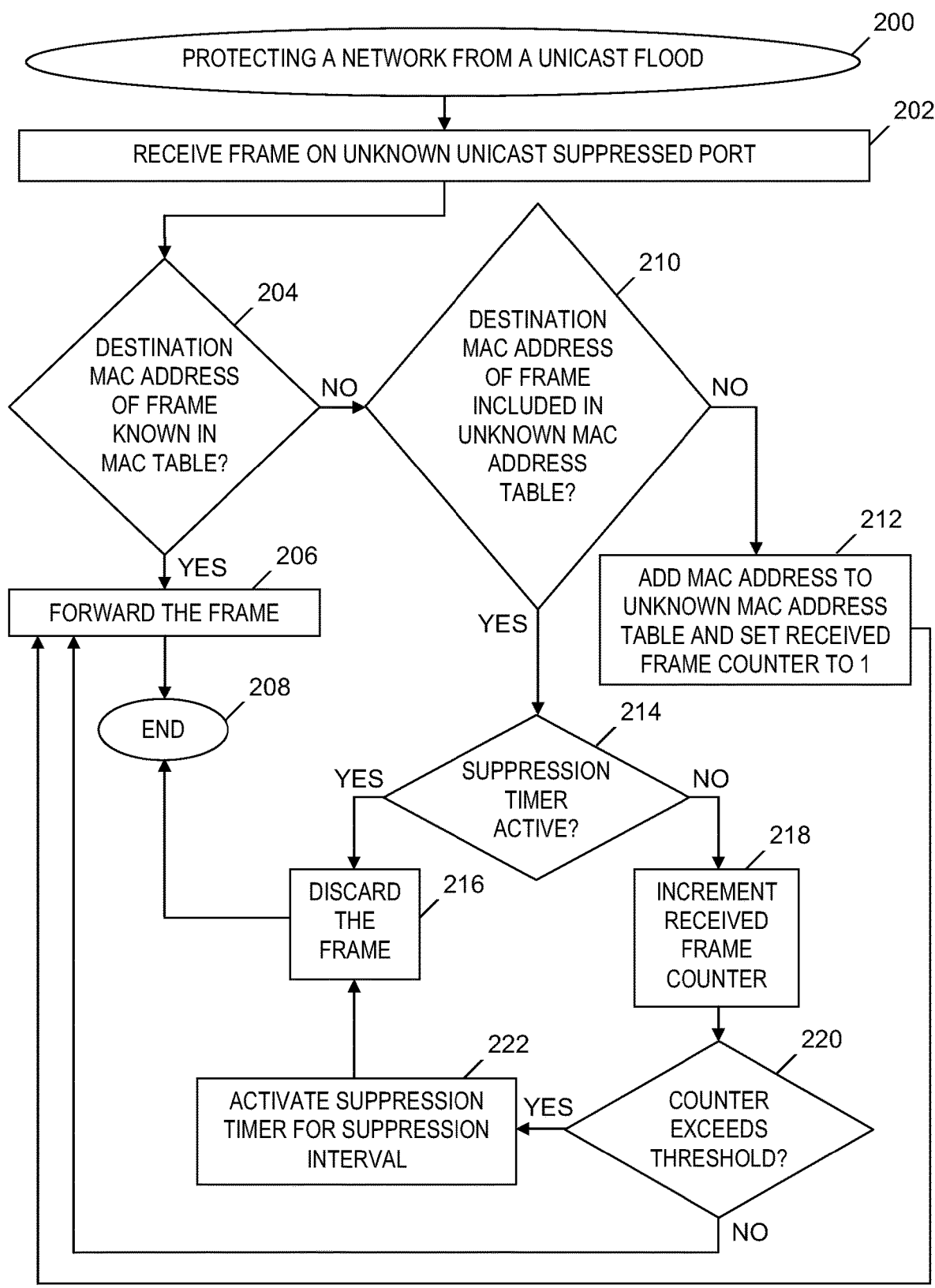
FIG. 2 is a flowchart of a process of protecting a network from a unicast flood, where the process is implemented in the system of FIG. 1, in accordance with embodiments of the present invention.
Figure 3:
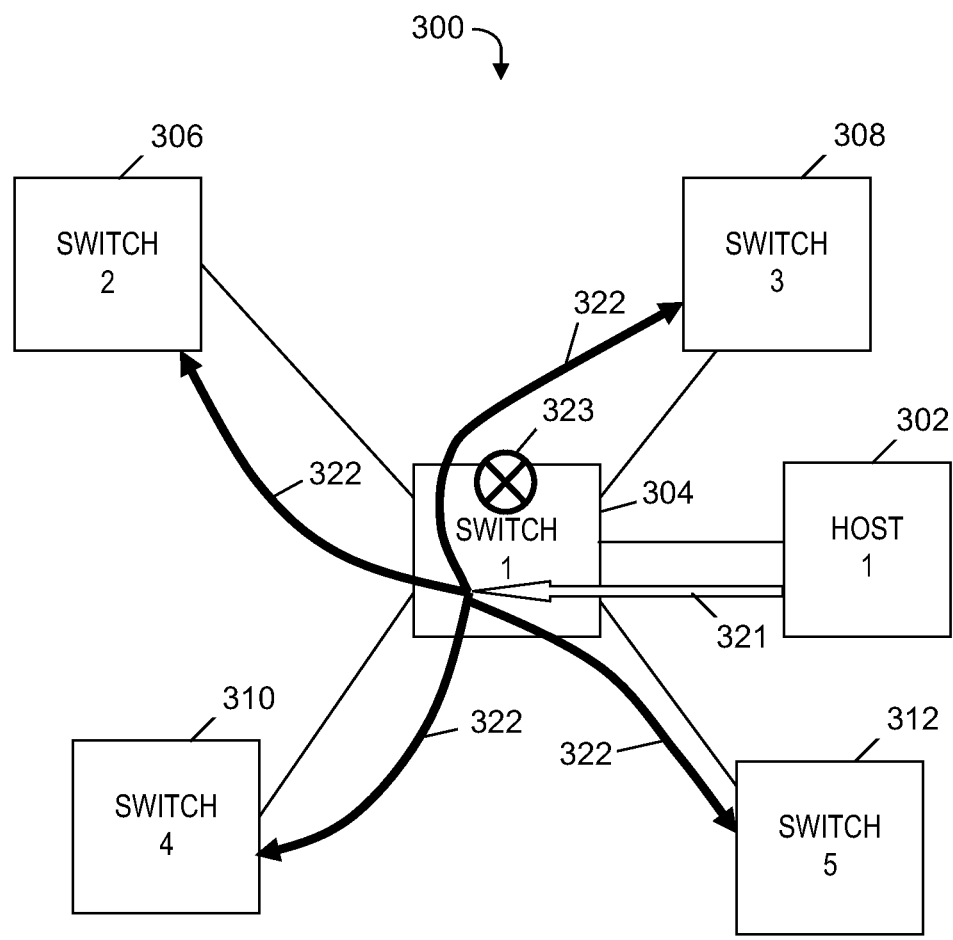
FIG. 3 is an example of determining whether to drop or discard an unknown unicast frame within the process of FIG. 2, in accordance with embodiments of the present invention.
Figure 4:
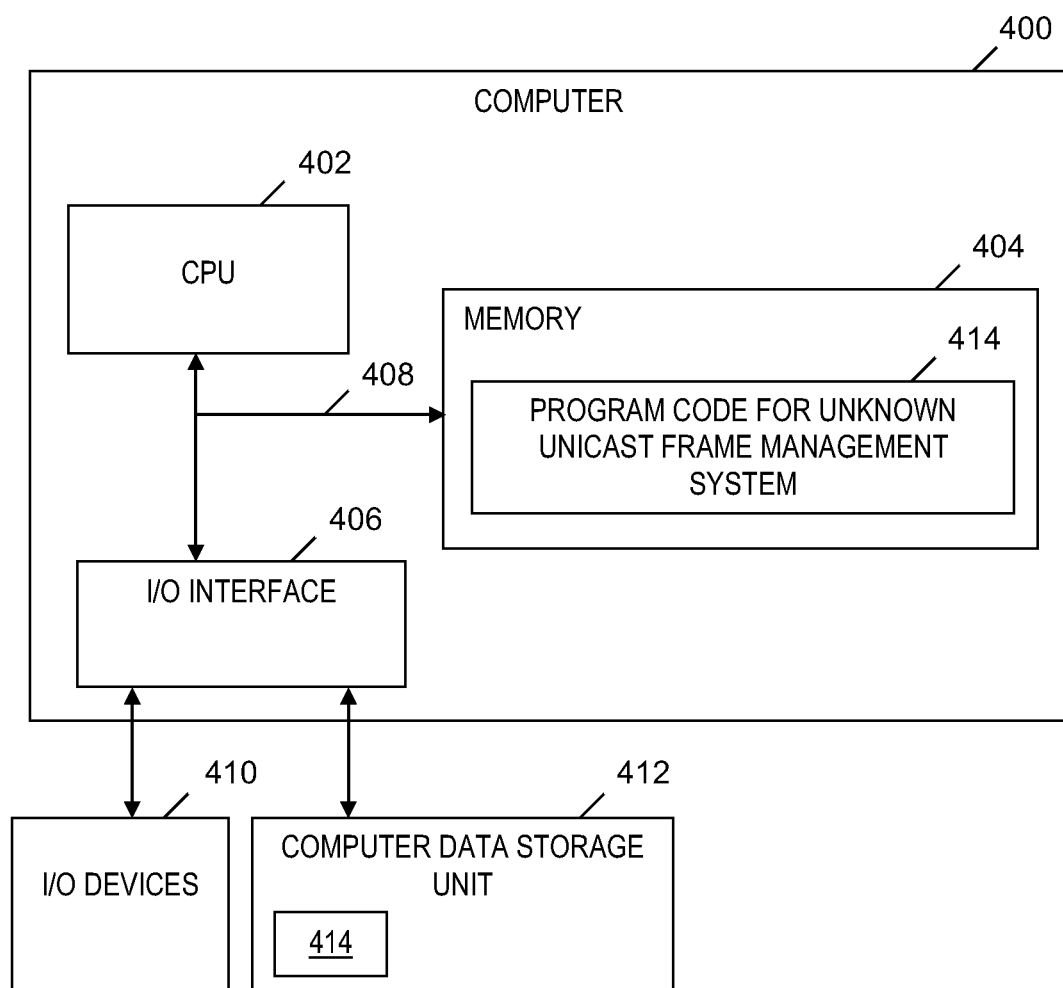
FIG. 4 is a block diagram of a computer that is included in the system of FIG. 1 and that implements the process of FIG. 2, in accordance with embodiments of the present invention.

The functionality of the components shown in FIG. 1 is described in more detail in the discussion of FIG. 2, FIG. 3, and FIG. 4 presented below.

Process for Protecting a Network from a Unicast Flood

FIG. 2 is a flowchart of a process of protecting a network from a unicast flood, where the process is implemented in the system of FIG. 1, in accordance with embodiments of the present invention. The process of FIG. 2 starts at step 200. In step 202, unknown unicast frame management system 104 (see FIG. 1) receives a frame (e.g., an Ethernet frame) on an unknown unicast suppressed port in a computer network. The frame received in step 202 has a destination MAC address (i.e., a MAC address of the destination of the frame).

In step 204, unknown unicast frame management system 104 (see FIG. 1) determines whether the destination MAC address of the frame received in step 202 is included in a MAC table which maps MAC addresses to ports and is used to route frames in the computer network. Hereinafter, in the discussion of FIG. 2, the destination MAC address of the frame received in step 202 is simply referred to as the MAC address. If unknown unicast frame management system 104 (see FIG. 1) determines in step 204 that the MAC address is in the MAC table, then the Yes branch of step 204 is followed and step 206 is performed. In step 206, unknown unicast frame management system 104 (see FIG. 1) sends the frame out the forwarding interface indicated in the MAC table. Following step 206, the process of FIG. 2 ends at step 208 and may be repeated with a receipt of a subsequent frame starting at step 202.

Returning to step 204, if unknown unicast frame management system 104 (see FIG. 1) determines that the MAC address of the frame is not known in the MAC table, then the No branch of step 204 is followed and step 210 is performed.

In step 210, unknown unicast frame management system 104 (see FIG. 1) determines whether the MAC address of the frame is included in unknown MAC address table 106 (see FIG. 1), which stores destination MAC addresses of frames received by computer networking device 102-1 (see FIG. 1), where the destination MAC addresses are unknown to the computer network. Unknown MAC address table 106 (see FIG. 1), which stores unknown destination MAC addresses, is different from the aforementioned MAC table, which maps MAC addresses to ports. If unknown unicast frame management system 104 (see FIG. 1) determines in step 210 that the MAC address is not included in unknown MAC address table 106 (see FIG. 1), then the No branch of step 210 is followed and step 212 is performed.

In step 212, unknown unicast frame management system 104 (see FIG. 1) adds the MAC address to unknown MAC address table 106 (see FIG. 1) together with a timestamp. Step 212 also includes unknown unicast frame management system 104 (see FIG. 1) setting a received frame counter to a value of one (or another predetermined initial value). The received frame counter counts the number of frames received in step 202 that have the MAC address as the address of the destination of the frames.

After step 212, step 206 includes unknown unicast frame management system 104 (see FIG. 1) forwarding the frame to non-blocked spanning tree links to try to find the MAC address in the computer network. Again, following step 206, the process of FIG. 2 ends at step 208 and may be repeated with a receipt of a subsequent frame starting at step 202.

Returning to step 210, if unknown unicast frame management system 104 (see FIG. 1) determines that the MAC address of the frame is included in unknown MAC address table 106 (see FIG. 1), then the Yes branch of step 210 is followed and step 214 is performed.

In step 214, unknown unicast frame management system 104 (see FIG. 1) determines whether a frame forwarding suppression timer is active (i.e., whether the frame forwarding suppression timer was activated in step 222 for a time interval which has not yet expired, where step 222 is described below). Hereinafter, in the discussion of FIG. 2, the frame forwarding suppression timer is referred to simply as the suppression timer. If unknown unicast frame management system 104 (see FIG. 1) determines in step 214 that the suppression timer is active, then the Yes branch of step 214 is followed and step 216 is performed.

In step 216, unknown unicast frame management system 104 (see FIG. 1) discards or drops the frame. Following step 216, the process of FIG. 2 ends at step 208 and may be repeated starting at step 202 with a receipt of a subsequent frame.

Returning to step 214, if unknown unicast frame management system 104 (see FIG. 1) determines that the suppression timer is not active, then the No branch of step 214 is followed and step 218 is performed. In step 218, unknown unicast frame management system 104 (see FIG. 1) increments the received frame counter (e.g., the value i of the counter becomes i+1) for the MAC address.

In step 220, unknown unicast frame management system 104 (see FIG. 1) determines whether the received frame counter exceeds a predefined threshold value. If unknown unicast frame management system 104 (see FIG. 1) determines in step 220 that the received frame counter exceeds the threshold value, then the Yes branch of step 220 is followed and step 222 is performed.

In step 222, unknown unicast frame management system 104 (see FIG. 1) activates the suppression timer for a predefined suppression time interval (i.e., a period of time during which unknown unicast frame management system 104 (see FIG. 1) discards the frame received in step 202). As frames are discarded by performances of step 222 within the suppression time interval, communications in the computer network are dampened, thereby preventing the computer network from experiencing a unicast flood. Although not shown in FIG. 2, after an expiration of the suppression time interval, unknown unicast frame management system 104 (see FIG. 1) deactivates the suppression timer (i.e., the state of the suppression timer changes from being active to being not active).

Following step 222, unknown unicast frame management system 104 (see FIG. 1) discards the frame in step 216. Again, after step 216, the process of FIG. 2 ends at step 208 and may be repeated with a receipt of a subsequent frame at step 202.

Returning to step 220, if unknown unicast frame management system 104 (see FIG. 1) determines that the received frame counter does not exceed the threshold value, then the No branch of step 220 is followed and step 206 is performed. In step 206 following step 220, unknown unicast frame management system 104 (see FIG. 1) forwards the frame to non-blocked spanning tree links in the computer network to try to find the MAC address in the computer network. Again, following step 206, the process of FIG. 2 ends at step 208 and may be repeated starting at step 202 with a receipt of a subsequent frame.

FIG. 3 is an example 300 of determining whether to drop or discard an unknown unicast frame within the process of FIG. 2, in accordance with embodiments of the present invention. In example 300, a computer network includes a host 302, switch 304, switch 306, switch 308, switch 310, and switch 312.

In step 321, switch 304 receives from host 302 frames with an unknown destination MAC address. Step 321 is an example of step 202 (see FIG. 2).

In step 322, switch 304 sends frames out to all non-blocked spanning tree links in the computer network to try to find the MAC address in the computer network as long as the suppression timer is not active. Step 322 is an example of step 206 (see FIG. 2) which follows step 220 (see FIG. 2) or step 212 (see FIG. 2).

In step 323, after the suppression timer has been activated and is still active, switch 304 receives frame(s) with the unknown MAC address and drops the frame(s) during a predefined time period (i.e., the suppression interval), thereby dampening communications for the predefined time period, which prevents a unicast flood in the computer network.

Computer System

FIG. 4 is a block diagram of a computer 400 that is included in the system of FIG. 1 and that implements the process of FIG. 2, in accordance with embodiments of the present invention. Computer 400 is a computer system that generally includes a central processing unit (CPU) 402, a memory 404, an input/output (I/O) interface 406, and a bus 408. Further, computer 400 is coupled to I/O devices 410 and a computer data storage unit 412. CPU 402 performs computation and control functions of computer 400, including executing instructions included in program code 414 for unknown unicast frame management system 104 (see FIG. 1) to perform a method of protecting a computer network from a unicast flood by managing unknown unicast frames, where the instructions are executed by CPU 402 via memory 404. CPU 402 may include a single processing unit, or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 400, and may include any type of transmission link, including electrical, optical, wireless, etc.

I/O interface 406 also allows computer 400 to store information (e.g., data or program instructions such as program code 414) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to protect a computer network from a unicast flood by managing unknown unicast frames. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

Storage unit 412 and/or one or more other computer data storage units (not shown) that are coupled to computer 400 may include unknown MAC address table 106 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to protecting a computer network from a unicast flood by managing unknown unicast frames. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 400) including one or more processors (e.g., CPU 402), wherein the processor(s) carry out instructions contained in the code causing the computer system to protecting a computer network from a unicast flood by managing unknown unicast frames. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of protecting a computer network from a unicast flood by managing unknown unicast frames.

While it is understood that program code 414 for protecting a computer network from a unicast flood by managing unknown unicast frames may be deployed by manually loading directly in client, server and proxy computers (not shown) via loading a computer-readable storage medium (e.g., computer data storage unit 412), program code 414 may also be automatically or semi-automatically deployed into computer 400 by sending program code 414 to a central server or a group of central servers. Program code 414 is then downloaded into client computers (e.g., computer 400) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of protecting a computer network from a unicast flood by managing unknown unicast frames. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 400). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 400) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 400) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 400), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer program product for protecting a network from a unicast flood, the computer program product comprising a computer readable storage medium having computer readable program code stored on the computer readable storage medium, wherein the computer readable storage medium is not a transitory signal per se, the computer readable program code being executed by a processor of a computing device in the network to cause the computing device to perform a method comprising the steps of:

the processor determining whether a media access control (MAC) address of a frame is included in a table of unknown MAC addresses, the MAC address being an address of a destination of the frame; and if the MAC address is not included in the table, the processor adding the MAC address to the table together with a timestamp and forwarding the frame to non-blocked spanning tree links to attempt to find the MAC address in the network, or if the MAC address is included in the table, the processor determining whether a timer for suppressing forwarding of frames is active, and
if the timer for suppressing forwarding of frames is active, the processor discarding the frame, or if the timer for suppressing forwarding of frames is not active, the processor incrementing a counter for counting received frames and determining whether the counter is greater than a threshold value, and
if the counter is greater than the threshold value, the processor activating the timer for suppressing forwarding of frames for a period of time and discarding the frame, or if the counter is not greater than the threshold value, the processor forwarding the frame to the non-blocked spanning tree links to attempt to find the MAC address in the network.

2. The computer program product of claim 1, wherein the method further comprises the step of the processor receiving the frame on an unknown unicast suppressed port, the frame being an Ethernet frame.

3. The computer program product of claim 1, wherein the method further comprises the steps of:
in response to the step of forwarding the frame to the non-blocked spanning tree links to attempt to find the MAC address in the network, the processor determining that the destination MAC address identifies a silent host in the network; and
based on the MAC address identifying the silent host, the processor forwarding subsequent frames to the MAC address without adding to the table the MAC address of the destinations of the subsequent frames.

4. The computer program product of claim 1, wherein the step of forwarding the frame to non-blocked spanning tree links to attempt to find the MAC address in the network includes forwarding the frame for a first predefined period of time or until a data limit is reached.

5. The computer program product of claim 4, wherein the method further comprises the steps of:
the processor determining that the MAC address is not found in the network after the first predefined period of time or the data limit is reached; and
in response to the step of determining that the MAC address is not found, the processor dropping, for a second predefined period of time, subsequent frames that are received by the switch, the subsequent frames having the MAC address as a destination of the subsequent frames.

6. The computer program product of claim 1, wherein the method further comprises the steps of:
the processor receiving a second frame having a second MAC address as a destination of the second frame;
the processor determining that the second MAC address is known to the network; and
based on the second MAC address being known to the network, the processor forwarding the second frame to the second MAC address.

7. A computer system comprising:
a processor which is hardware;
a memory coupled to the processor; and
a computer readable storage device coupled to the processor, the computer readable storage device containing instructions that are executed by the processor via the memory to implement a method of protecting a network from a unicast flood, the computer system being a switch in the network, the method comprising the steps of:

the processor determining whether a media access control (MAC) address of a frame is included in a table of unknown MAC addresses, the MAC address being an address of a destination of the frame; and
if the MAC address is not included in the table, the processor adding the MAC address to the table together with a timestamp and forwarding the frame to non-blocked spanning tree links to attempt to find the MAC address in the network, or if the MAC address is included in the table, the processor determining whether a timer for suppressing forwarding of frames is active, and
if the timer for suppressing forwarding of frames is active, the processor discarding the frame, or if the timer for suppressing forwarding of frames is not active, the processor incrementing a counter for counting received frames and determining whether the counter is greater than a threshold value, and
if the counter is greater than the threshold value, the processor activating the timer for suppressing forwarding of frames for a period of time and discarding the frame, or if the counter is not greater than the threshold value, the processor forwarding the frame to the non-blocked spanning tree links to attempt to find the MAC address in the network.

8. The computer system of claim 7, wherein the method further comprises the step of the processor receiving the frame on an unknown unicast suppressed port, the frame being an Ethernet frame.

9. The computer system of claim 7, wherein the method further comprises the steps of:
in response to the step of forwarding the frame to the non-blocked spanning tree links to attempt to find the MAC address in the network, the processor determining that the destination MAC address identifies a silent host in the network; and
based on the MAC address identifying the silent host, the processor forwarding subsequent frames to the MAC address without adding to the table the MAC address of the destinations of the subsequent frames.

10. The computer system of claim 7, wherein the step of forwarding the frame to non-blocked spanning tree links to attempt to find the MAC address in the network includes forwarding the frame for a first predefined period of time or until a data limit is reached.

11. The computer system of claim 10, wherein the method further comprises the steps of:
the processor determining that the MAC address is not found in the network after the first predefined period of time or the data limit is reached; and
in response to the step of determining that the MAC address is not found, the processor dropping, for a second predefined period of time, subsequent frames that are received by the switch, the subsequent frames having the MAC address as a destination of the subsequent frames.

12. The computer system of claim 7, wherein the method further comprises the steps of:
the processor receiving a second frame having a second MAC address as a destination of the second frame;
the processor determining that the second MAC address is known to the network; and based on the second MAC address being known to the network, the processor forwarding the second frame to the second MAC address.

\* \* \* \* \*